(12) United States Patent
Skelly et al.

(10) Patent No.: US 11,926,420 B2
(45) Date of Patent: Mar. 12, 2024

(54) AIRCRAFT CABIN PARTITION SYSTEM

(71) Applicant: B/E Aerospace, Inc., Winston-Salem, NC (US)

(72) Inventors: Trevor Skelly, Bellevue, WA (US); Michael Krenz, Roscoe, IL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 208 days.

(21) Appl. No.: 17/245,387

(22) Filed: Apr. 30, 2021

(65) Prior Publication Data
US 2021/0347481 A1    Nov. 11, 2021

Related U.S. Application Data

(60) Provisional application No. 63/022,293, filed on May 8, 2020.

(51) Int. Cl.
*B64D 11/00* (2006.01)
*F16B 12/32* (2006.01)

(52) U.S. Cl.
CPC .......... *B64D 11/0023* (2013.01); *F16B 12/32* (2013.01)

(58) Field of Classification Search
CPC ........ B64D 11/0023; B64D 2011/0046; E04B 2/721; E04B 2/7401; E04B 2002/7474
See application file for complete search history.

(56) References Cited

U.S. PATENT DOCUMENTS

| | | |
|---|---|---|
| 2,859,710 A | 11/1958 | Elsner |
| 3,312,181 A | 4/1967 | Davidson |
| 3,990,204 A * | 11/1976 | Haworth ............... E04B 2/7427 52/645 |
| 4,085,684 A | 4/1978 | McLennan et al. |
| 4,109,891 A | 8/1978 | Grendahl |

(Continued)

FOREIGN PATENT DOCUMENTS

| | | | | |
|---|---|---|---|---|
| CN | 112832422 A * | 5/2021 | ............... | E04B 2/74 |
| DE | 20214202 U1 * | 2/2003 | ........... | E04B 2/7425 |

(Continued)

OTHER PUBLICATIONS

Search Report for European Application No. 21173143.5 dated Sep. 28, 2021, 8 pages.

*Primary Examiner* — Joshua J Michener
*Assistant Examiner* — Ryan Andrew Yankey
(74) *Attorney, Agent, or Firm* — Suiter Swantz pc llo

(57) ABSTRACT

An aircraft cabin partition system may include at least a first partition with a partition cut-out and a first flange with a first flange cut-out. The aircraft cabin partition system may include a first coupling assembly configured to be inserted within the first flange cut-out, configured to be inserted within an opening of a seat rail within a floor of an aircraft cabin, and configured to couple the at least the first partition to the seat rail when engaged. The aircraft cabin partition system may include at least a second partition with a second flange with a second flange cut-out. The aircraft cabin partition system may include a second coupling assembly configured to be inserted within the partition cut-out, configured to be inserted within the second flange cut-out, and configured to couple the at least the second partition to the at least the first partition when engaged.

12 Claims, 13 Drawing Sheets

(56) References Cited

U.S. PATENT DOCUMENTS

| | | | |
|---|---|---|---|
| 4,185,799 A * | 1/1980 | Richards, Jr. | B64D 11/0023 410/105 |
| 4,250,676 A * | 2/1981 | Presby | G09F 15/0068 52/239 |
| 5,082,224 A * | 1/1992 | Hayward | B64D 11/0023 403/378 |
| 5,520,357 A * | 5/1996 | Payne | B64D 11/0023 244/118.6 |
| 5,871,318 A * | 2/1999 | Dixon | B60N 2/01558 410/104 |
| 5,975,822 A * | 11/1999 | Ruff | B64D 11/0696 411/85 |
| 7,374,131 B2 * | 5/2008 | Tiid | B64D 9/003 411/398 |
| 7,413,143 B2 | 8/2008 | Frantz et al. | |
| 7,975,979 B2 | 7/2011 | Bishop | |
| 8,668,181 B2 * | 3/2014 | Dazet | B60P 7/0807 248/500 |
| 8,678,337 B2 | 3/2014 | Grünewald | |
| 8,944,378 B2 | 2/2015 | Bishop et al. | |
| 9,097,003 B1 * | 8/2015 | Sultan | B64C 1/069 |
| 9,328,506 B2 * | 5/2016 | Gibson | E04C 2/292 |
| 9,663,232 B1 | 5/2017 | Porter et al. | |
| 10,113,768 B2 * | 10/2018 | Carlyon | B32B 3/28 |
| 10,179,651 B2 * | 1/2019 | Olulana | B64D 11/064 |
| 10,307,313 B2 | 6/2019 | Schroeder et al. | |
| 10,518,862 B2 * | 12/2019 | Burd | B64D 11/04 |
| 10,660,440 B2 * | 5/2020 | Rocamora | A47B 47/00 |
| 2007/0011987 A1 * | 1/2007 | McAleenan | E04C 2/296 52/782.1 |
| 2007/0295862 A1 * | 12/2007 | Hupperich | B64D 11/0606 244/129.1 |
| 2010/0011699 A1 * | 1/2010 | Weimer | E04C 2/52 52/745.1 |
| 2015/0115100 A1 * | 4/2015 | Schliwa | B64D 11/04 244/118.1 |
| 2017/0129608 A1 * | 5/2017 | Reams | B64D 11/0638 |
| 2018/0194471 A1 | 7/2018 | Merrick et al. | |
| 2019/0039737 A1 * | 2/2019 | Chantal | B64D 11/0606 |
| 2019/0106213 A1 | 4/2019 | Minyard et al. | |
| 2021/0179273 A1 * | 6/2021 | Senechal | B64D 11/0023 |
| 2021/0387728 A1 * | 12/2021 | Young | B64C 1/18 |

FOREIGN PATENT DOCUMENTS

| | | | |
|---|---|---|---|
| DE | 102016125146 A1 * | 6/2018 | |
| DE | 202020003491 U1 * | 12/2020 | |
| EP | 2252508 B1 * | 9/2011 | B64D 11/04 |
| EP | 2252508 B1 | 9/2011 | |
| EP | 2465774 A1 * | 6/2012 | B64D 11/0023 |
| EP | 2868578 A1 | 5/2015 | |
| GB | 787750 A | 12/1957 | |
| GB | 847792 A | 9/1960 | |
| GB | 2161846 A * | 1/1986 | B63B 29/02 |
| GB | 2440532 A * | 2/2008 | E04B 2/7401 |
| GB | 2580429 A * | 7/2020 | E04B 2/7401 |
| KR | 20170091909 A * | 8/2017 | |
| WO | 2005039920 A1 | 5/2005 | |
| WO | WO-2005039920 A1 * | 5/2005 | B60N 2/01566 |

\* cited by examiner

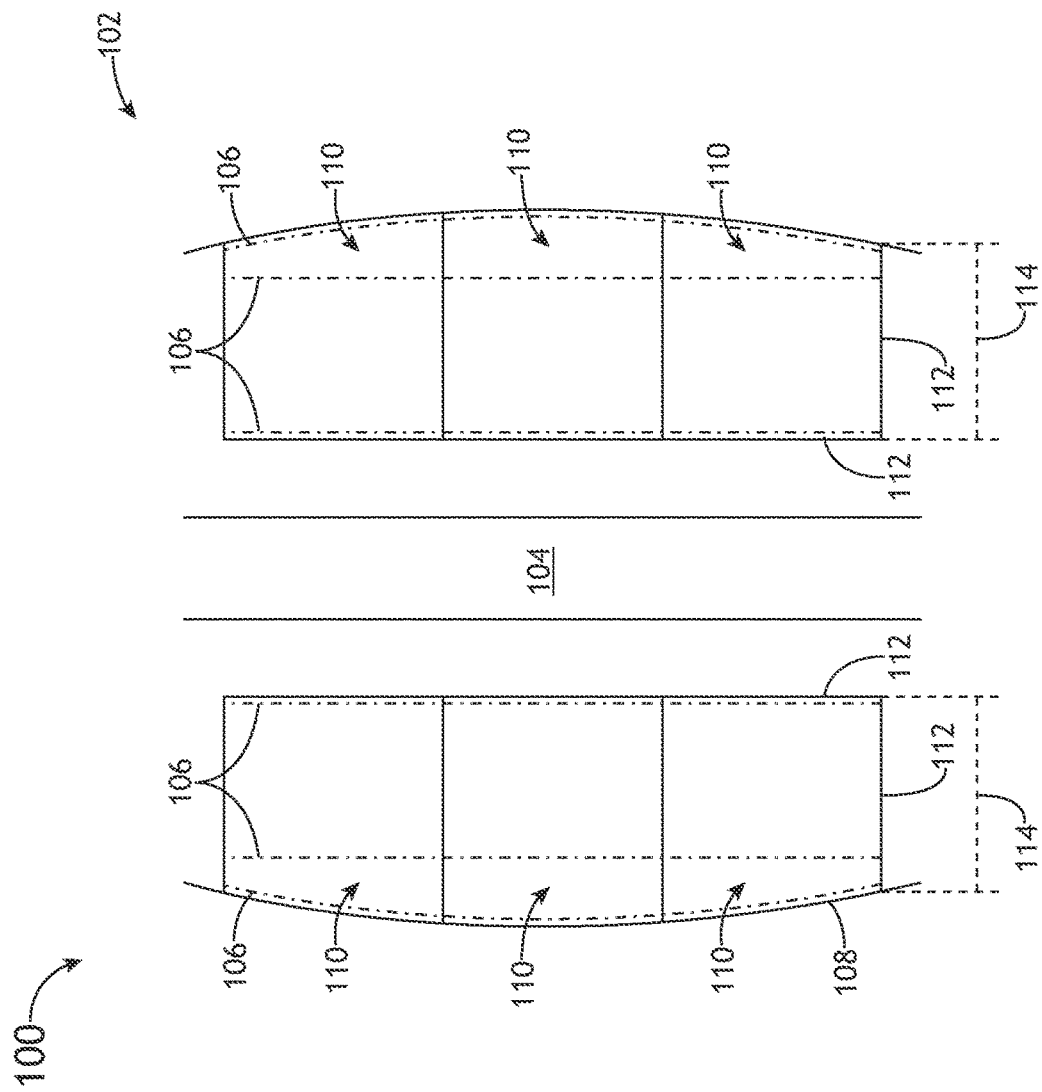

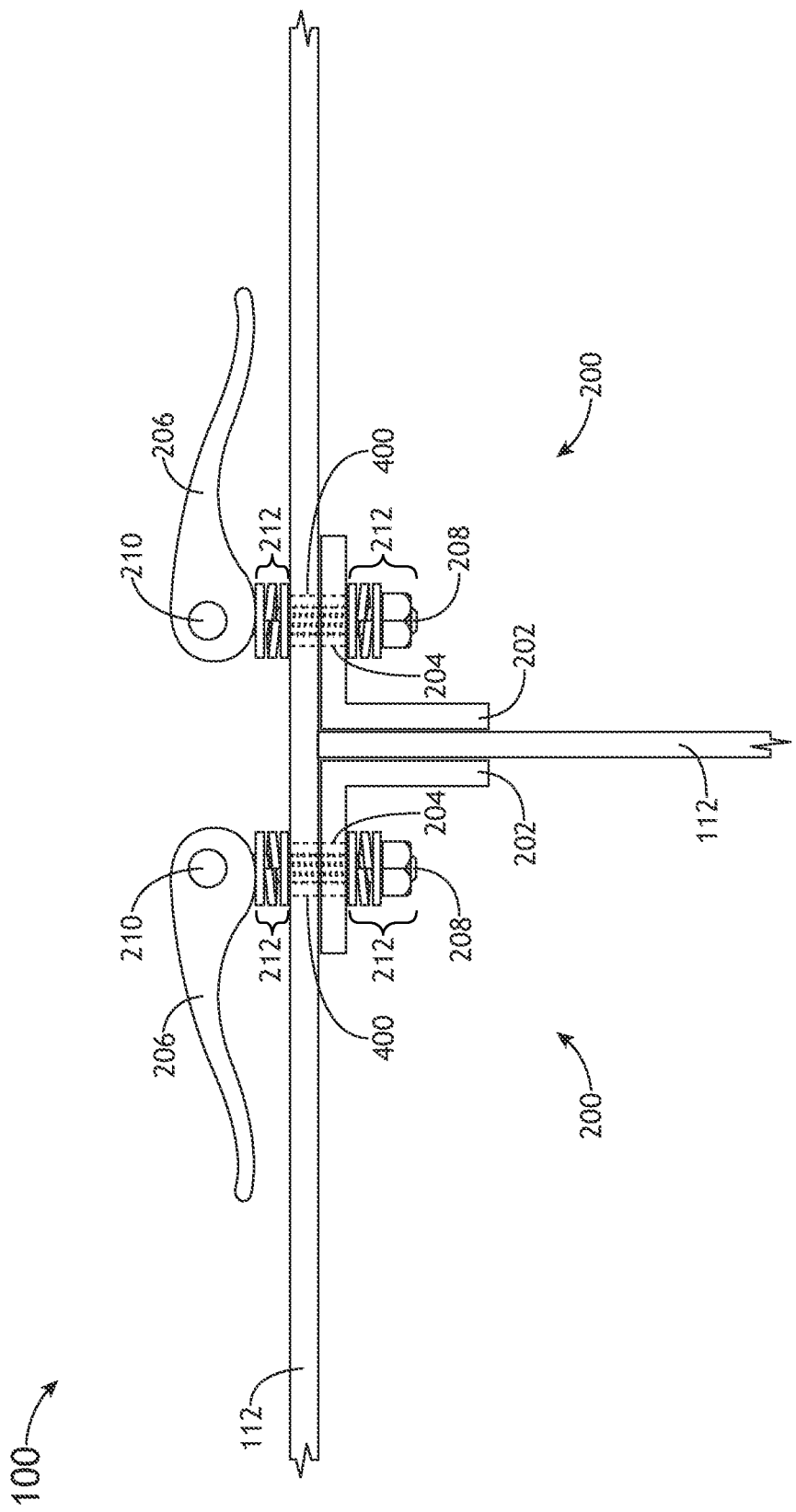

AIRCRAFT CABIN PARTITION SYSTEM

CROSS-REFERENCE TO RELATED APPLICATIONS

The present application is related to and claims benefit of the earliest available effective filing date from the following applications: the present application claims the benefit of U.S. Provisional Application Ser. No. 63/022,293, filed May 8, 2020, which is incorporated herein by reference in the entirety.

BACKGROUND

Airlines may desire to have the flexibility to re-configure an aircraft cabin. Reconfigurations of the aircraft cabin, however, may need to be rapid, non-permanent, cost-effective, and/or not include unnecessary weight. In addition, reconfigurations of the aircraft cabin need to meet aviation guidelines and/or standards (e.g., weight-bearing requirements, load-bearing requirements, or the like).

SUMMARY

An aircraft cabin partition system is disclosed, in accordance with one or more embodiments of the disclosure. The aircraft cabin partition system may include at least a first partition with a partition cut-out and a first flange. The first flange may include a first flange cut-out. The aircraft cabin partition system may include a first coupling assembly. The first coupling assembly may be configured to be inserted within the first flange cut-out. The first coupling assembly may be configured to be inserted within an opening of a seat rail within a floor of an aircraft cabin. The first coupling assembly may be configured to couple the at least the first partition to the seat rail when engaged. The aircraft cabin partition system may include at least a second partition with a second flange. The second flange may include a second flange cut-out. The aircraft cabin partition system may include a second coupling assembly. The second coupling assembly may be configured to be inserted within the partition cut-out. The second coupling assembly may be configured to be inserted within the second flange cut-out. The second coupling assembly may be configured to couple the at least the second partition to the at least the first partition when engaged.

In some embodiments, the at least the first partition may include a second partition cut-out. The at least the second partition may include a third flange. The third flange may include a third flange cut-out. The aircraft cabin partition system may include a third coupling assembly. The third coupling assembly may be configured to be inserted within the third flange cut-out. The third coupling assembly may be configured to be inserted within the second partition cut-out. The third coupling assembly may be configured to couple the at least the second partition to the at least the first partition when the third coupling assembly is engaged.

In some embodiments, the at least the second partition may include a third flange. The third flange may include a third flange cut-out. The aircraft cabin partition system may include a third coupling assembly. The third coupling assembly may be configured to be inserted within the third flange cut-out. The third coupling assembly may be configured to be inserted within a second opening of a second seat rail. The third coupling assembly may be configured to couple the at least the second partition to the second seat rail when the third coupling assembly is engaged.

In some embodiments, at least one of the first coupling assembly, the second coupling assembly, or the third coupling assembly may include a lock component configured to find within at least one of the first flange cut-out, the second flange cut-out, the third flange cut-out, or the partition cut-out. At least one of the first coupling assembly, the second coupling assembly, or the third coupling assembly may include an actuator configured to actuate the lock component by engaging and disengaging. At least one of the first coupling assembly, the second coupling assembly, or the third coupling assembly may include one or more sets of spacers or fasteners configured to provide a tensioning force when the actuator is engaged.

In some embodiments, at least one of the second coupling assembly may be configured to insert in the opening of the seat rail and engage a section of the seat rail or the third coupling assembly may be configured to insert in the opening of the second seat rail and engage a section of the second seat rail.

In some embodiments, the second seat rail may be within the floor of the aircraft cabin.

In some embodiments, the second seat rail may be coupled to a fuselage wall.

In some embodiments, a width of the at least the second partition may be dependent on a distance between the at least the first partition and the fuselage wall.

In some embodiments, the aircraft cabin partition system may include a cargo box with a plurality of sides defined by the at least the first partition, the at least the second partition, and a fuselage wall.

In some embodiments, the at least the first partition may include a first partition. The at least the second partition may include a second partition and a third partition. The plurality of sides of the cargo box may be defined by the first partition, the second partition, the third partition, and the fuselage wall.

In some embodiments, the cargo box may include a volume dependent on at least one of a height of the at least the first partition, a height of the at least the second partition, a distance between the first partition and the fuselage wall, or a distance between the second partition and the third partition.

In some embodiments, the at least the first partition may be parallel to an aisle of the aircraft cabin. The at least the second partition may be perpendicular to the aisle of the aircraft cabin.

In some embodiments, the second partition and the third partition may be perpendicular to the first partition.

In some embodiments, the partition cut-out may be aligned with the opening of the seat rail.

An interlocking assembly for an aircraft cabin partition system is disclosed, in accordance with one or more embodiments of the disclosure. The interlocking assembly may include a flange coupled to at least a first partition of the aircraft cabin partition system. The flange may include a flange cut-out. The interlocking assembly may include a coupling assembly. The coupling assembly may be configured to be inserted within the flange cut-out. The coupling assembly may be configured to be inserted into an opening of a seat rail within a floor of an aircraft cabin and couple the at least the first partition to the seat rail when engaged. The coupling assembly may be configured to be inserted into a partition cut-out of at least a second partition of the aircraft cabin partition system and couple the at least the second partition to the at least the first partition when engaged.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 1A illustrates a plan view of an aircraft cabin including an aircraft cabin partition system, in accordance with one or more embodiments of the disclosure;

FIG. 4A illustrates a top plan view of an aircraft cabin partition system, in accordance with one or more embodiments of the disclosure;

DETAILED DESCRIPTION OF THE INVENTION

Figure 1B:
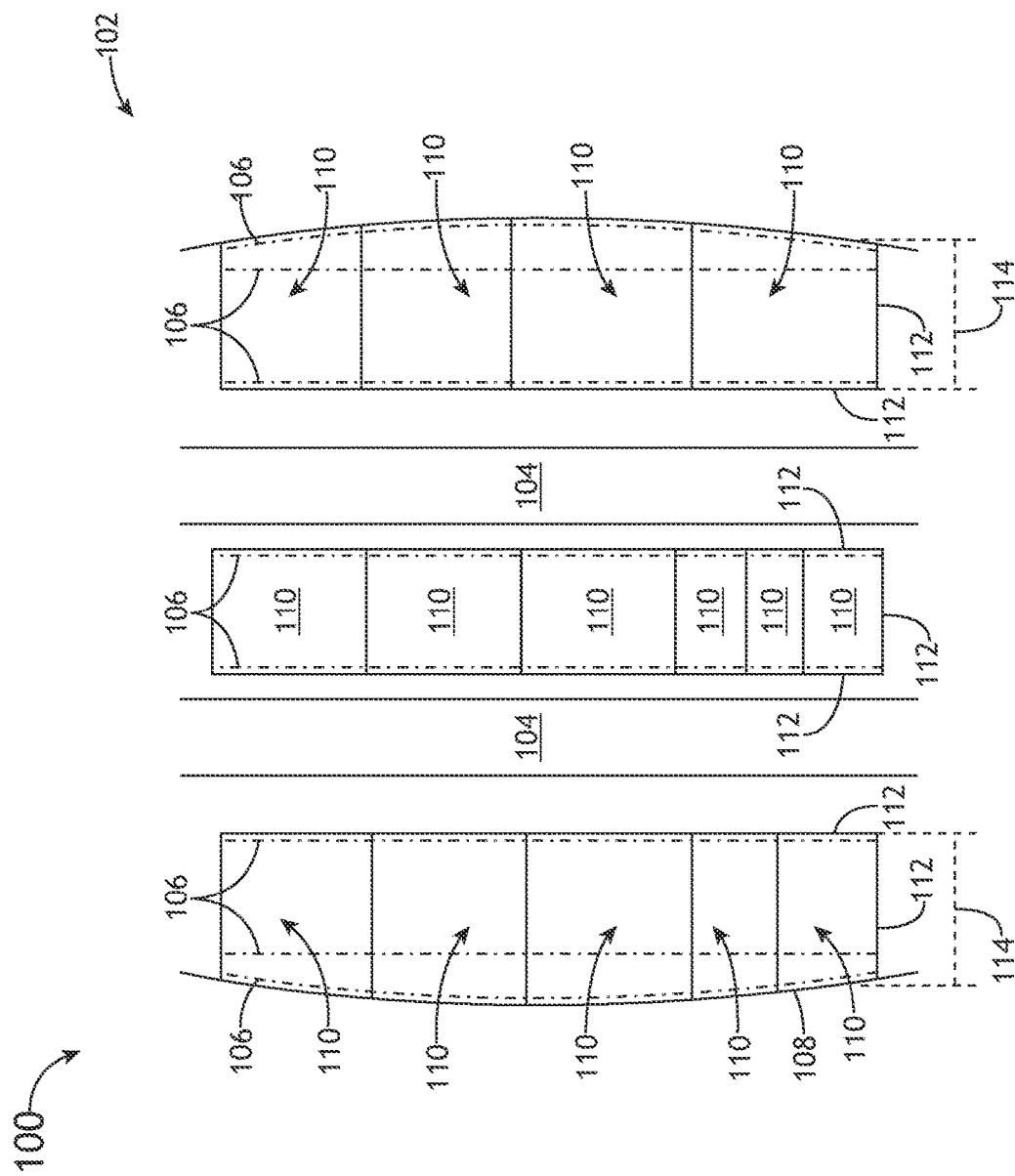
FIG. 1B illustrates a top plan view of an aircraft cabin including an aircraft cabin partition system, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-7 generally illustrate an aircraft cabin partition system, in accordance with one or more embodiments of the disclosure.

Airlines may desire to have the flexibility to re-configure an aircraft cabin. For example, an airline may desire to switch a configuration of an aircraft cabin between transporting passengers and hauling cargo, where the demand by passengers needed transportation decreases and the demand for cargo being hauled increases. The cargo hauled within an aircraft cabin may be light and bulky, requiring tie-downs to prevent movement of the cargo during hauling.

Reconfigurations of the aircraft cabin may need to be non-permanent, rapid, cost-effective, and/or not include unnecessary weight.

For example, reconfigurations of the aircraft cabin may require removing and re-installing the existing aircraft seats. Temporary structures and/or monuments should be configured to couple to existing components installed within the aircraft cabin and corresponding to the existing aircraft seats, as opposed to a more permanent conversion of the aircraft cabin (e.g., installation of cargo tie downs, or the like).

By way of another example, reconfigurations of the aircraft cabin may require the use of off-the-shelf and/or easily modifiable quick-connect or quick-release components to couple the temporary structures and/or monuments to the aircraft cabin.

By way of another example, the temporary structures and/or monuments may be fabricated from materials selected to reduce overall weight of the partition system while still meeting aviation guidelines and/or standards (e.g., weight-bearing requirements, load-bearing requirements, or the like). When modifying an aircraft cabin, load-bearing/weight-bearing requirements must be met without losing the intended functionality of the aircraft cabin. In addition, the modifications to the aircraft cabin may need to take into account that an aircraft cabin is less supported within an aircraft fuselage than an air freighter cargo deck. In general, any structure and/or monument installed within the aircraft cabin may need to be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), or any other standards setting organization or company; the Radio Technical Commission for Aeronautics (RTCA) or any other guidelines agency or organization; or the like.

As such, it would be beneficial to provide an aircraft cabin partition system that allows for the conversion of an aircraft cabin between transporting passengers and hauling cargo. The aircraft cabin partition system should use existing components installed within the aircraft cabin of the aircraft. The aircraft cabin partition system should include quick-connect or quick-release components. The aircraft cabin partition system should be adjustable, removable, and rearrangeable.

FIGS. 1A and 1B generally illustrate an aircraft cabin partition system 100, in accordance with one or more embodiments of the disclosure. It is noted herein that "aircraft cabin partition system 100" and variants of the term including, but not limited to, "aircraft cabin partition system 100," "partition system 100," "system 100," or the like may be considered equivalent, for purposes of the disclosure.

The aircraft cabin partition system 100 may be installed within an aircraft cabin 102. The aircraft cabin 102 may include one or more aisles 104. The aircraft cabin 102 may include one or more sets of seat rails 106. For example, a set of seat rails 106 may include at least two seat rails 106 coupled to or installed within a floor of the aircraft cabin 102. By way of another example, the set of seat rails 106 may include a seat rail 106 coupled to or installed within the floor of the aircraft cabin 102 and a seat rail 106 coupled to or installed within a fuselage wall 108.

The partition system 100 may include one or more cargo bins 110. The one or more cargo bins 110 may be defined by one or more walls or partitions 112. For example, the one or more cargo bins 110 may be defined by one or more walls or partitions 112 installed in the aircraft cabin 102 parallel to the one or more aisles 104. By way of another example, the one or more cargo bins 110 may be defined by one or more walls or partitions 112 installed in the aircraft cabin 102 at an angle ranging between 0 degrees and 180 degrees with respect to the one or more aisles 104. For instance, the one or more cargo bins 110 may be defined by one or more walls or partitions 112 installed in the aircraft cabin 102 perpendicular or 90 degrees to the one or more aisles 104. In this regard, the partition system 100 (and the cargo bins 110) may be oriented in any manner within the aircraft cabin 102.

The cargo bin 110 may be open-top. To meet aviation guidelines and/or standards, a cargo net may be installed over the top of the cargo bin 110. It is noted herein, however, that the partition system 100 may include one or more ceiling panels configured to couple to the one or more walls or partitions 112. Therefore, the above description should not be interpreted as a limitation on the present disclosure but merely an illustration.

The one or more walls or partitions 112 may be any height. In general, the height of the one or more walls or partitions 112 may be independent of any particular aircraft cabin 102 in which the partition system 100 may be installed. It is noted herein, however, that existing monuments or structures within a particular aircraft cabin 102 (e.g., overhead stowage compartments, or the like) may affect the total possible height of the one or more walls or partitions 112, such that the one or more walls or partitions 112 may be designed to accommodate the existing monuments or structures within the particular aircraft cabin 102.

The one or more walls or partitions 112 may be any thickness and/or length/width (e.g., the definition of length versus width being dependent on the orientation of the one or more walls or partitions 112 within the aircraft cabin 102). For example, walls or partitions 112 installed parallel with the one or more aisles 104 may be of a similar length. By way of another example, walls or partitions 112 installed at an angle to the one or more aisles 104 may have a width that is dependent at least in part on a select distance 114. For instance, the distance 114 may be defined as the distance between a parallel wall or partition 112 and the fuselage wall 108. In addition, the distance 114 may be defined as the distance between a set of parallel walls or partitions 112. By way of another example, walls or partitions 112 installed at an angle to the one or more aisles 104 may be extendable (e.g., with foldable sections, telescopic sections, or the like) to conform to different fuselage walls 108.

The volume of a particular cargo bin 110 may be dependent on at least one of the height, length/width, and/or thickness of a particular set of walls or partitions 112 that define the cavity within the particular cargo bin 110. It is noted herein the aircraft cabin partition system 100 may include cargo bins 110 having the same volume within the aircraft cabin 102. In addition, it is noted herein the aircraft cabin partition system 100 may include cargo bins 110 having different volumes within the aircraft cabin 102. Further, it is noted herein the aircraft cabin partition system 100 may include a combination of cargo bins 110 having the same volume and cargo bins 110 having different volumes within the aircraft cabin 102.

The one or more walls or partitions 112 may be fabricated from any solid or composite material including, but not limited to, a metal (e.g., sheet aluminum, or the like), a thermoplastic or a thermoset, or other material configured to meet aviation guidelines and/or standards. The one or more walls or partitions 112 may be fabricated with a solid structure, a structure with holes or cut-outs (e.g., a lattice structure or other pattern for weight relief), a honeycomb structure, or other structure configured to meet aviation guidelines and/or standards.

Figure 2A:
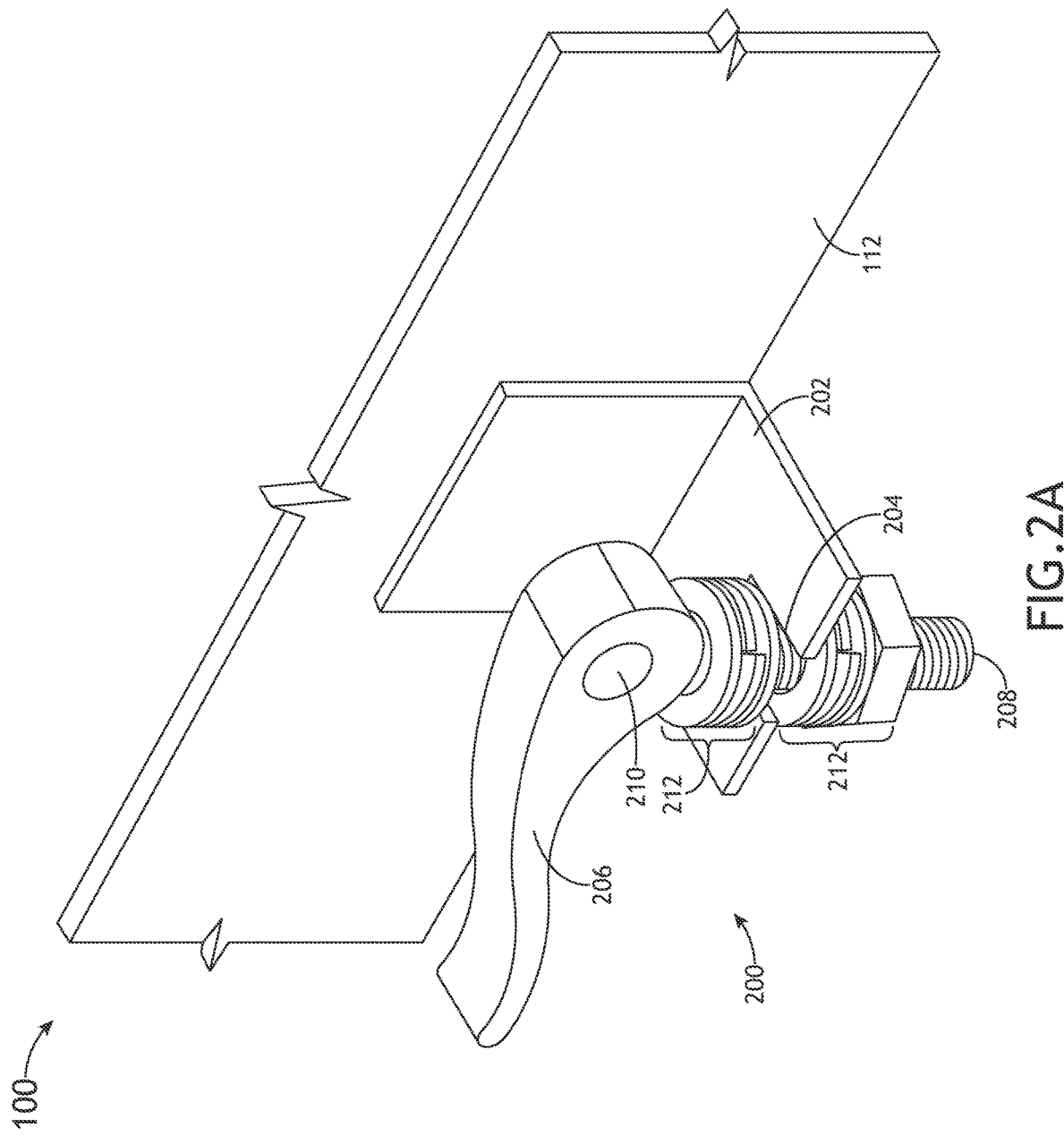
FIG. 2A illustrates a perspective view of an aircraft cabin partition system, in accordance with one or more embodiments of the disclosure.
Figure 2B:
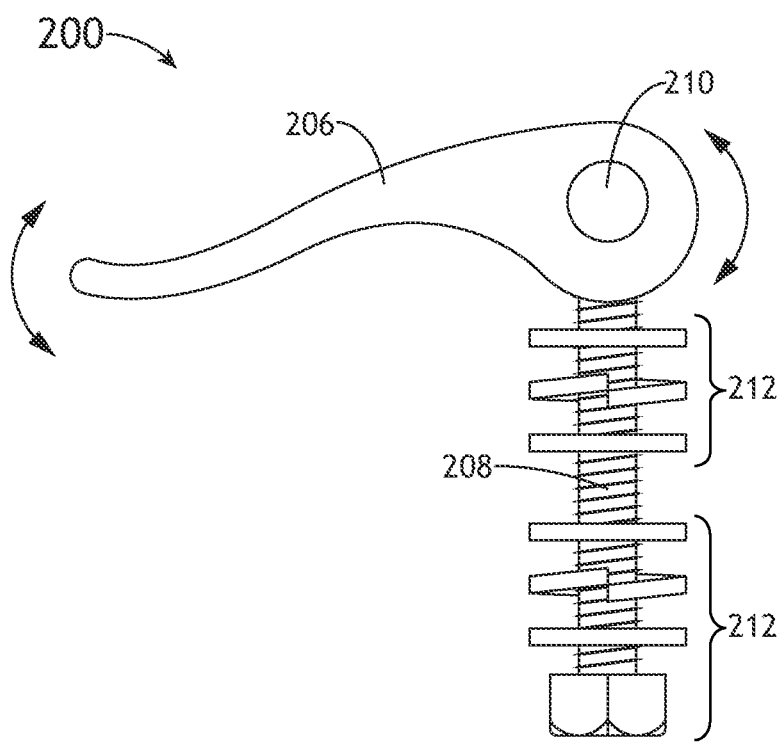
FIG. 2B illustrates a coupling assembly of an aircraft cabin partition system, in accordance with one or more embodiments of the disclosure.

FIGS. 2A and 2B generally illustrate the aircraft cabin partition system 100, in accordance with one or more embodiments of the disclosure.

The aircraft cabin partition system 100 may include one or more coupling assemblies 200. In general, the one or more coupling assemblies 200 may include one or more assemblies configured to couple adjacent structures within the aircraft cabin 102 together without the need for fasteners, adhesives, tools, or the like. It is noted herein the one or more coupling assemblies 200 may include one or more rotation assemblies, one or more translation assemblies, and/or a combination of rotation and translation assemblies (e.g., where rotation is converted to translation, where translation is converted to rotation, or the like). In addition, it is noted herein the complexity of the one or more coupling assemblies 200 may increase the cost of the aircraft component and/or may increase the possibility of aircraft component malfunction (e.g., due to part wear or failure) or complete breakdown (e.g., following repeated use, during an emergency situation, or the like).

The coupling assembly 200 may be configured to engage with or disengage from a flange 202. The flange 202 may include one or more openings 204 configured to receive one or more coupling assemblies 200. For example, the one or more openings 204 may include a cut-out (e.g., a slot, a recess, a notch, a groove, or the like) within an exterior edge or surface of the flange 202. By way of another example, the one or more openings 204 may include a hole through the flange 202. It is noted herein a cut-out within an exterior edge or surface of the flange 202 may allow for a quick-connect or quick-release aspect to the coupling assembly 200.

One or more of the flanges 202 may be coupled to any particular wall or partition 112. In general, the one or more flanges 202 may be positioned around the perimeter of a particular wall or partition 112. For example, a wall or partition 112 installed parallel to the one or more aisles 104 may include one or multiple flanges 202 to allow for one or more multiple points of coupling to a particular seat rail 106. By way of another example, a wall or partition 112 installed at an angle to the one or more aisles 104 may include a flange 202 to allow for a point of coupling to a particular seat rail 106 and/or a flange 202 to allow for a point of coupling to a particular wall or partition 112.

The flange 202 may be coupled to an exterior surface of a wall or partition 112. The flange 202 may be coupled to an interior surface of a wall or partition 112 (e.g., a surface within a cargo space defined by adjacent walls or partitions 112). In general, the flange 202 may be coupled to the wall or partition 112 via one or more fasteners (e.g., screws, nuts, washers, or the like), one or more spot welds, an adhesive or epoxy, or the like.

The coupling assembly 200 may include an actuator 206. For example, the actuator 206 may include a handle, clamp, lever, knob, button, toggle, or the like. When actuated, the actuator 206 may be configured to engage or disengage (e.g., lock or unlock, attach or detach, or the like) the coupling assembly 200 from another component within the aircraft cabin 102 (e.g., a seat rail 106, a wall or partition 112, or the like).

The coupling assembly 200 may include a lock component 208. For example, the lock component 208 may include a shaft, a pin, an end with a non-circular diameter, or other lock components configured to prevent the coupling assembly 200 from engaging or disengaging when actuated by the actuator 206. For instance, the shaft may be threaded (e.g., a threaded rod, or the like).

The actuator 206 may be coupled to the lock component 208 directly or indirectly, such that actuation of the actuator 206 may directly or indirectly actuate the lock component 208. For example, the actuator 206 may be coupled to the lock component 208 via a pin 210, such that actuation of the actuator 206 creates a separate actuation of the lock component 208 (e.g., a rotation motion of the actuator 206 converting to a translation motion of the lock component 208, or the like). By way of another example, the actuator 206 may be directly coupled to the lock component 208, such that actuation of the actuator 206 similarly actuates the lock component 208 (e.g., a rotation motion for both, or the like).

The coupling assembly 200 may include one or more spacers or fasteners 212. For example, the one or more spacers or fasteners 212 may include, but are not limited to, flat washers, lock or split washers, bushings, nuts, or the like. The one or more spacers or fasteners 212 may be configured to provide an anchoring force to more securely couple the lock component 208 portion of the coupling assembly 200 to another component within the aircraft cabin 102 (e.g., a seat rail 106, a wall or partition 112, or the like) as compared to if the lock component 208 alone is engaged.

In one non-limiting example, the coupling assembly 200 may include a twist clamp 206 coupled to a threaded shaft 208, where the shaft 208 includes spacers or fasteners 212 including one or more stacks of lock or split washers surrounded by flat washers, and an end screw. The shaft 208 may be configured to insert within the opening 204 of the flange 202, and the spacers or fasteners 212 including the one or more stacks of lock or split washers surrounded by flat washers may engage one or more surfaces of the flange 202. When the twist clamp 206 is actuated, the spacers or fasteners 212 including the one or more stacks of lock or split washers surrounded by flat washers may provide a tensioning force to the combination of the actuator 206 and the threaded shaft 208. It is noted herein the shaft 208 may require enough flex or travel length to allow the actuator 206 to engage and disengage.

It is noted herein the coupling assembly 200 and the flange 202 may be considered an interlocking assembly, for purposes of the present disclosure.

Figure 3A:
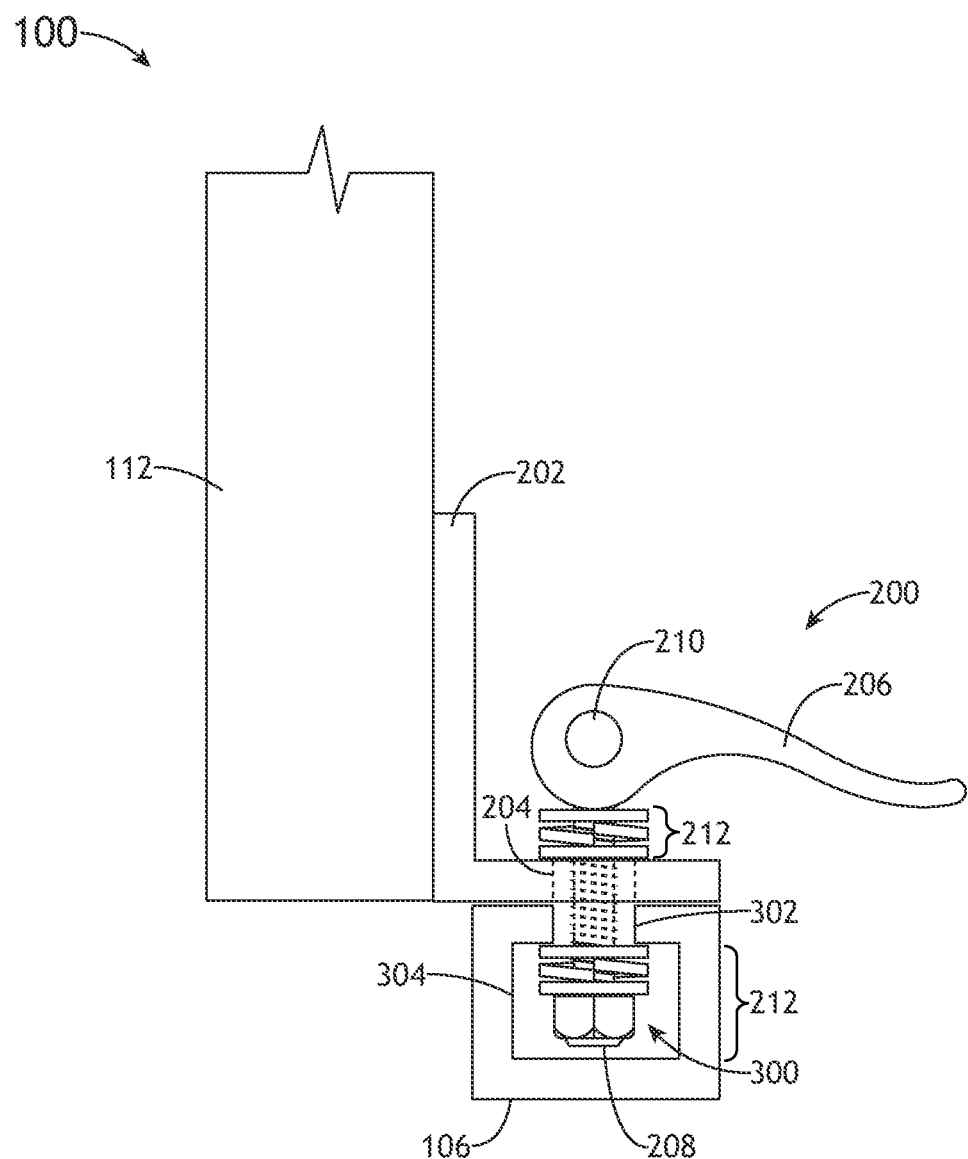
FIG. 3A illustrates a side elevation view of an aircraft cabin partition system, in accordance with one or more embodiments of the disclosure.
Figure 3B:
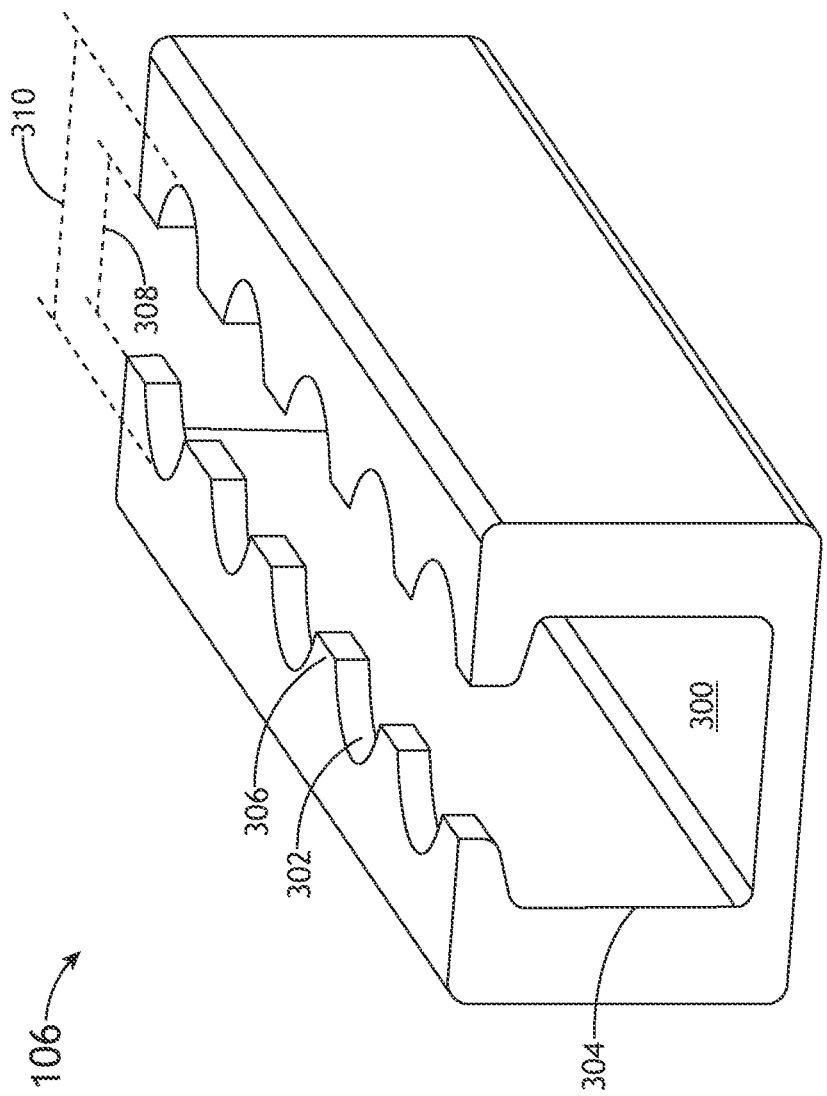
FIG. 3B illustrates a seat rail of an aircraft cabin, in accordance with one or more embodiments of the disclosure.
Figure 4B:
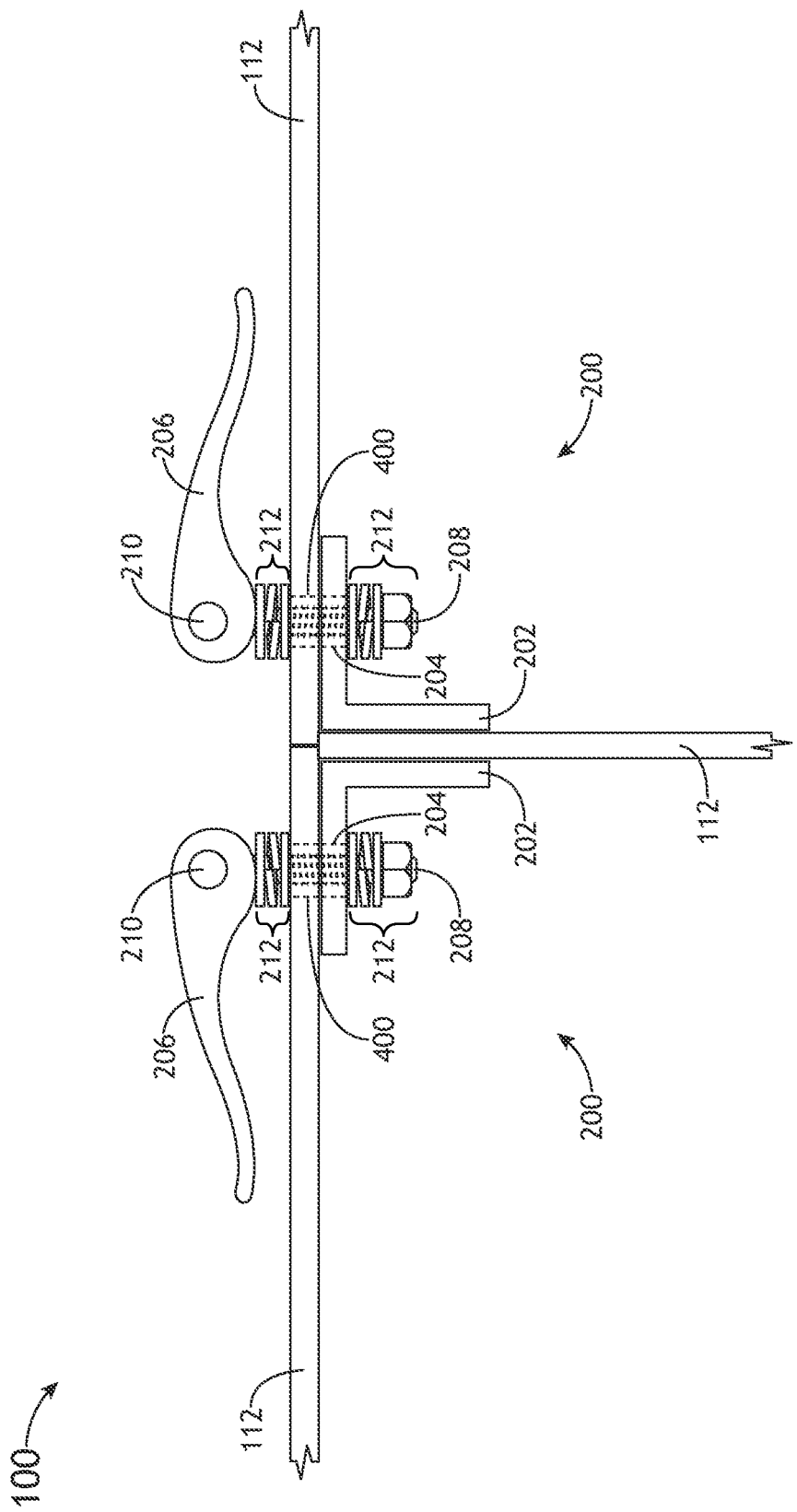
FIG. 4B illustrates a top plan view of an aircraft cabin partition system, in accordance with one or more embodiments of the disclosure.
Figure 5A:
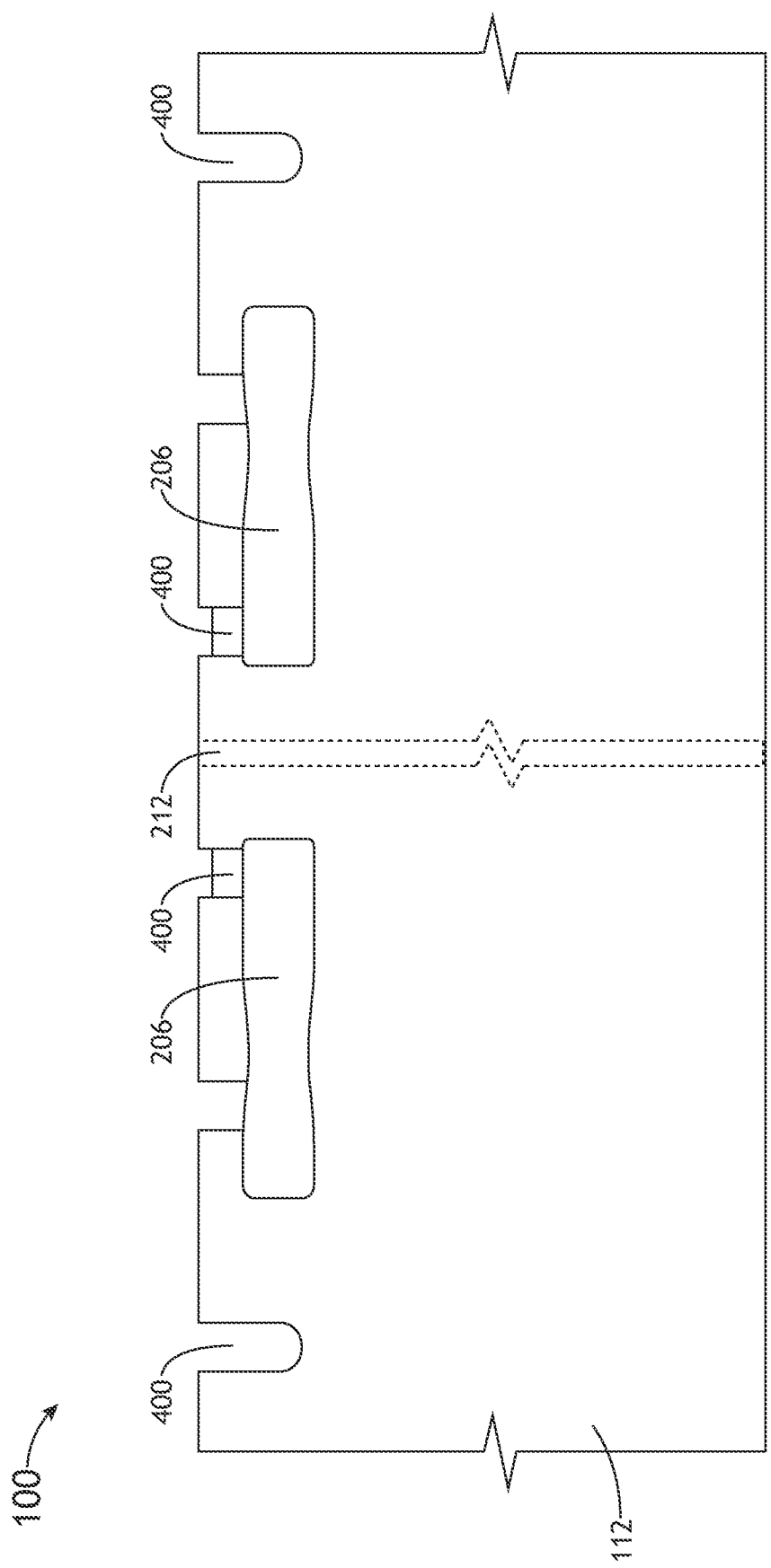
FIG. 5A illustrates a front elevation view of an aircraft cabin partition system, in accordance with one or more embodiments of the disclosure.
Figure 5B:
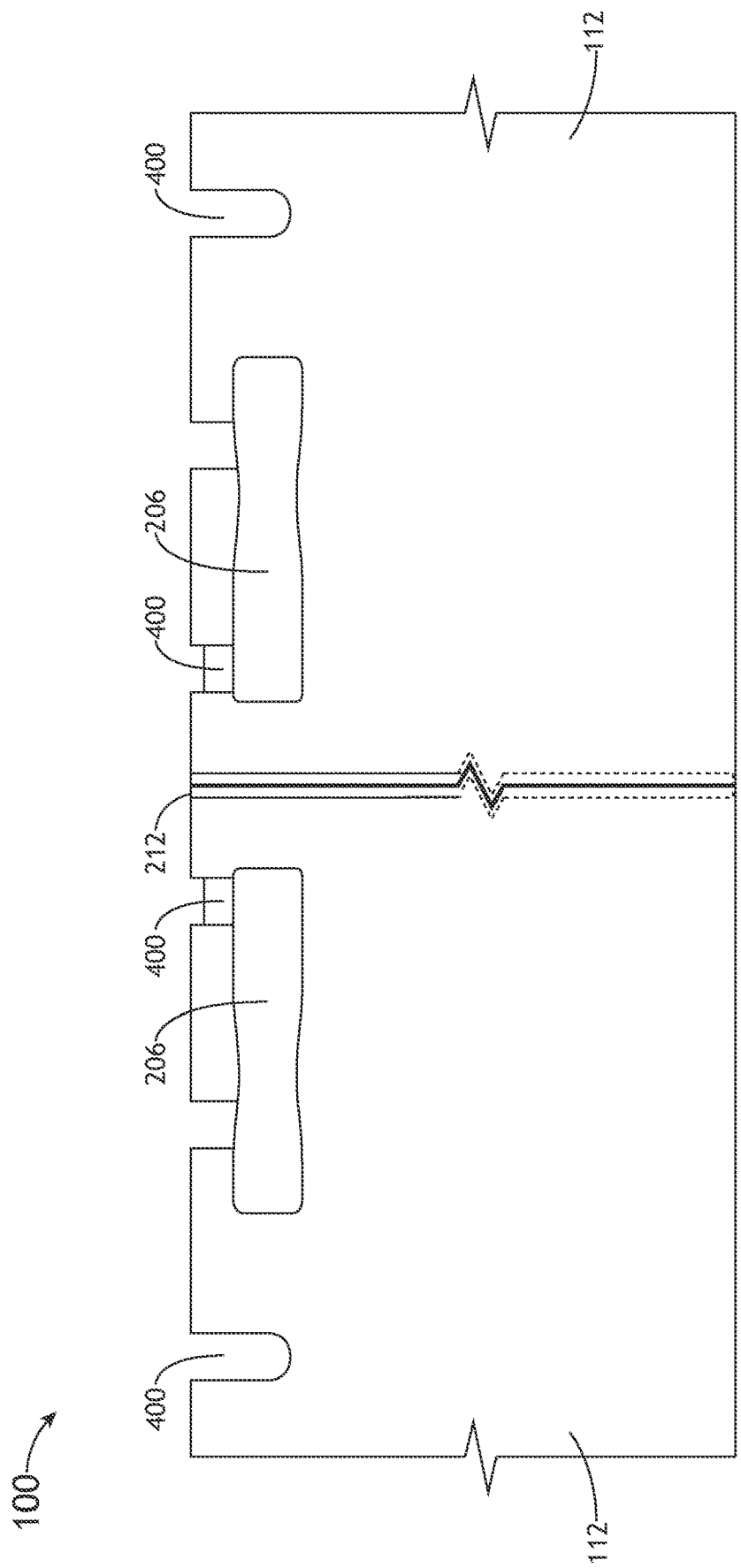
FIG. 5B illustrates a front elevation view of an aircraft cabin partition system, in accordance with one or more embodiments of the disclosure.
Figure 6A:
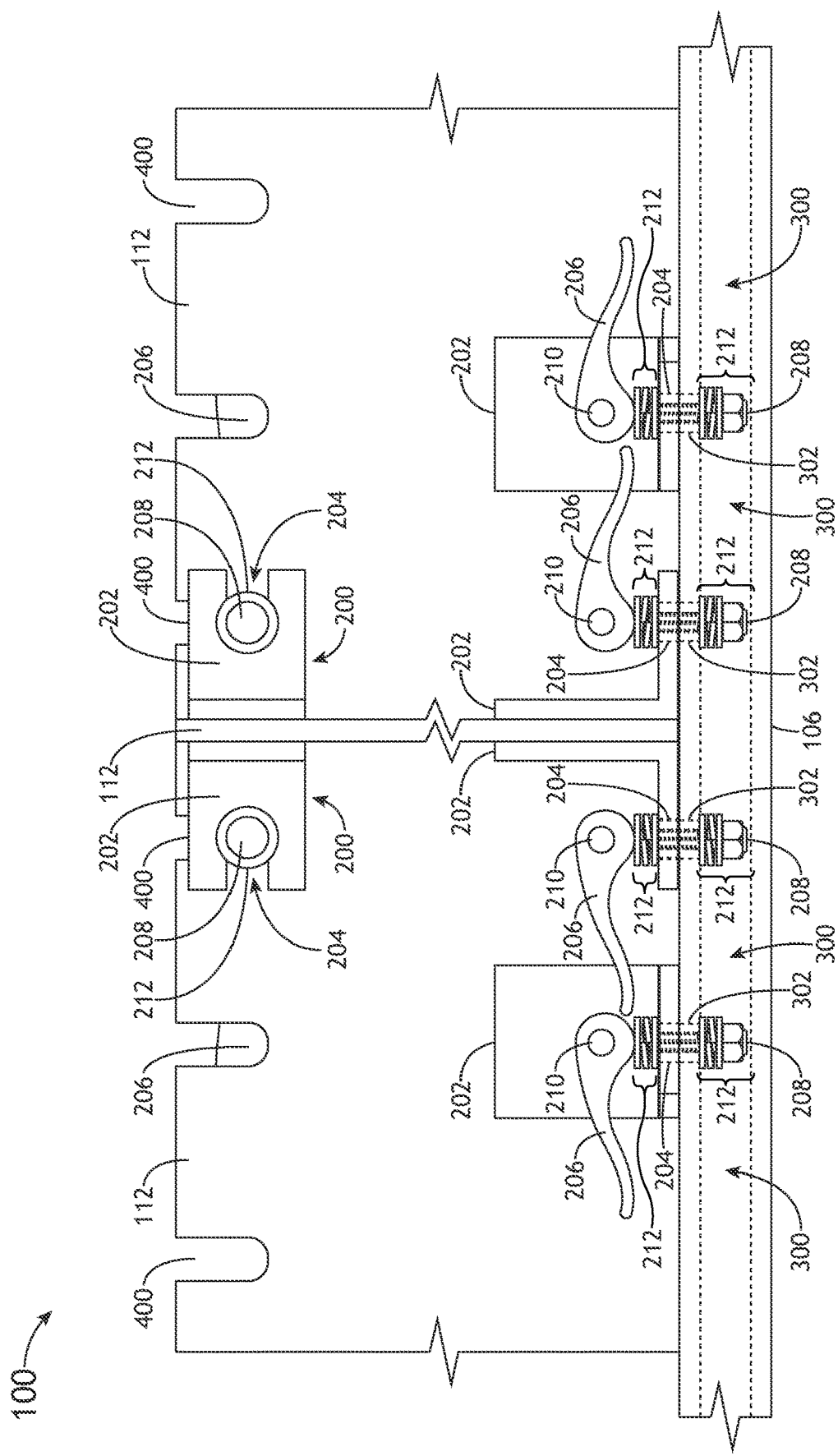
FIG. 6A illustrates a rear elevation view of an aircraft cabin partition system, in accordance with one or more embodiments of the disclosure.
Figure 6B:
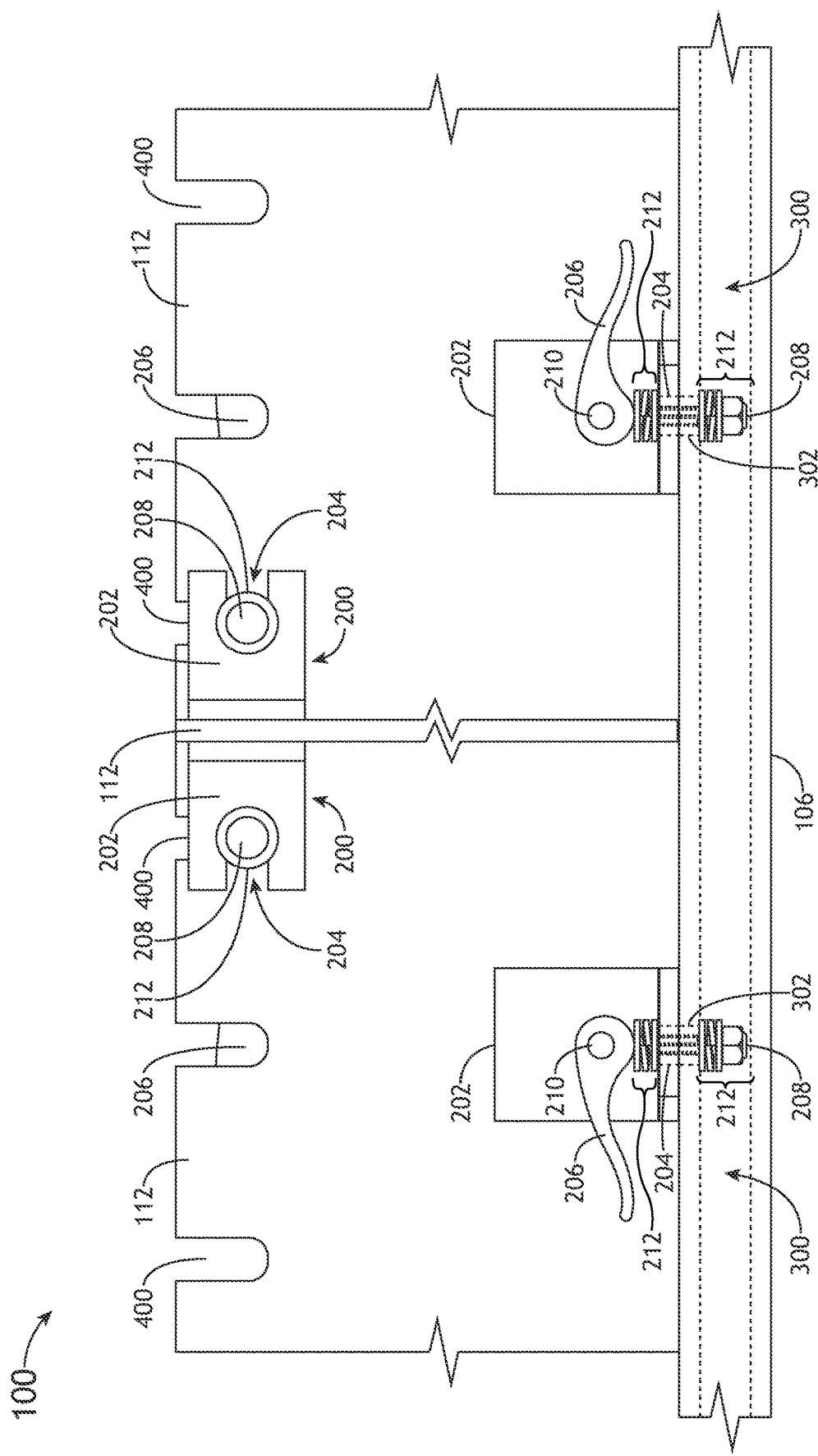
FIG. 6B illustrates a rear elevation view of an aircraft cabin partition system, in accordance with one or more embodiments of the disclosure.

FIGS. 3A and 3B generally illustrate the aircraft cabin partition system 100, in accordance with one or more embodiments of the disclosure.

A seat rail 106 may include a cavity 300 defined within the one or more sides of the seat rail 106. The cavity 300 may be accessible via one or more openings 302 within a top surface of the seat rail 106. For example, adjacent openings 302 may be spaced 1-inch apart. It is noted herein, however, that the cavity 300 may be accessible via one or more openings 304 within a side surface of the seat rails 106. In addition, it is noted herein the one or more seat rails 106 may be accessible when the one or more aircraft seats are removed from the aircraft cabin 102.

The one or more flanges 202 may be coupled to the one or more walls or partitions 112 such that the one or more openings 204 of the one or more flanges 202 may be aligned with (e.g., adjacent openings are similarly-spaced to) the one or more openings 302 within the one or more seat rails 106 installed within the aircraft cabin. For example, the spacing may be 1-inch.

At least a portion of the coupling assembly 200 may pass through an opening 302 and into the cavity 300. The actuator 206 may be actuated to cause the portion of the coupling assembly 200 passing through the opening 302 to engage a separate section 306 with an opening width 308, the opening width 308 being reduced in diameter as compared to an opening width 310 of the opening 302. For example, to engage the separate section 306 with the reduced opening width 308 and secure the wall or partition 112 in place, the portion of the coupling assembly 200 may be inserted into an opening 302 and the coupling assembly 200 may be translated within the seat rail 106 until the coupling assembly 200 can engage with the separate section 306. For instance, a set of spacers or fasteners 212 may engage with an underside surface of the separate section 306 within the cavity 300. It is noted herein this type of engagement between the coupling assembly 200 and the seat rail 106 may allow for a quick-connect or quick-release aspect to the wall or partition 112.

FIGS. 4A-6B generally illustrate the aircraft cabin partition system 100, in accordance with one or more embodiments of the disclosure.

The one or more walls or partitions 112 may include one or more openings 400. For example, the one or more openings 400 may include a cut-out (e.g., a slot, a recess, a notch, a groove, or the like) within an exterior edge or surface of the one or more walls or partitions 112. By way of another example, the one or more openings 400 may include a hole through the one or more walls or partitions 112. It is noted herein a cut-out within an exterior edge or surface of the flange 202 may allow for a quick-connect or quick-release aspect between the coupling assembly 200 and a pair of walls or partitions 112.

The one or more openings 204, 302, 304, 400 may have a select geometry. For example, the select geometry may include a shape with an open area, where the open area passes through an exterior edge or surface. For instance, the shape may include, but is not limited to, an open letter such as the letter U or V, or the like. By way of another example, the select geometry may include a shape with a closed area having 2, 3, up to an N number of sides. For instance, the shape may include, but is not limited to, a circle, a rectangle, a closed letter such as the letter D, or the like.

A wall or partition 112 may be set at an angle to a second wall partition 112. The wall or partition 112 may include a single flange 202 or a double flange 202. An opening 204 of a particular flange 202 and a corresponding opening 400 within the wall or partition 112 may be configured to receive a coupling assembly 200. When the coupling assembly 200 is engaged, the wall or partition 112 set at an angle to the second wall partition 112 may be securely coupled to the second wall partition 112.

Where the wall or partition 112 includes a double flange 202, both flanges 202 may be coupled to the same second wall or partition 112. It is noted herein, however, that each flange 202 may be coupled to a different second wall or partition 112. In this regard, the wall or partition 112 including the double flange 202 may serve as a joint between adjacent second walls or partitions 112.

In general, the one or more openings 400 may be positioned around the perimeter of a wall or partition 112. The one or more openings 400 may be aligned with (e.g., adjacent openings are similarly-spaced to) the one or more openings 302 within the one or more seat rails 106 installed within the aircraft cabin 102. For example, the spacing may be 1-inch.

For example, the one or more openings 400 may be proximate to a top edge and/or a side edge of a first wall or partition 112. A coupling assembly 200 may be passed through an opening 400 and configured to engage a flange 202 of a second wall or partition 112. The actuator 206 may be positioned proximate to an exterior surface of the first wall or partition 112. The actuator 206 may be positioned proximate to an interior surface of the first wall or partition 112 and the flange 202 of the second wall or partition 112.

By way of another example, the one or more openings 400 may be proximate to a bottom edge of a wall or partition 112. A coupling assembly 200 may be passed through an opening 302 of the seat rail 106 and configured to engage a flange 202 of the wall or partition 112.

Figure 7:
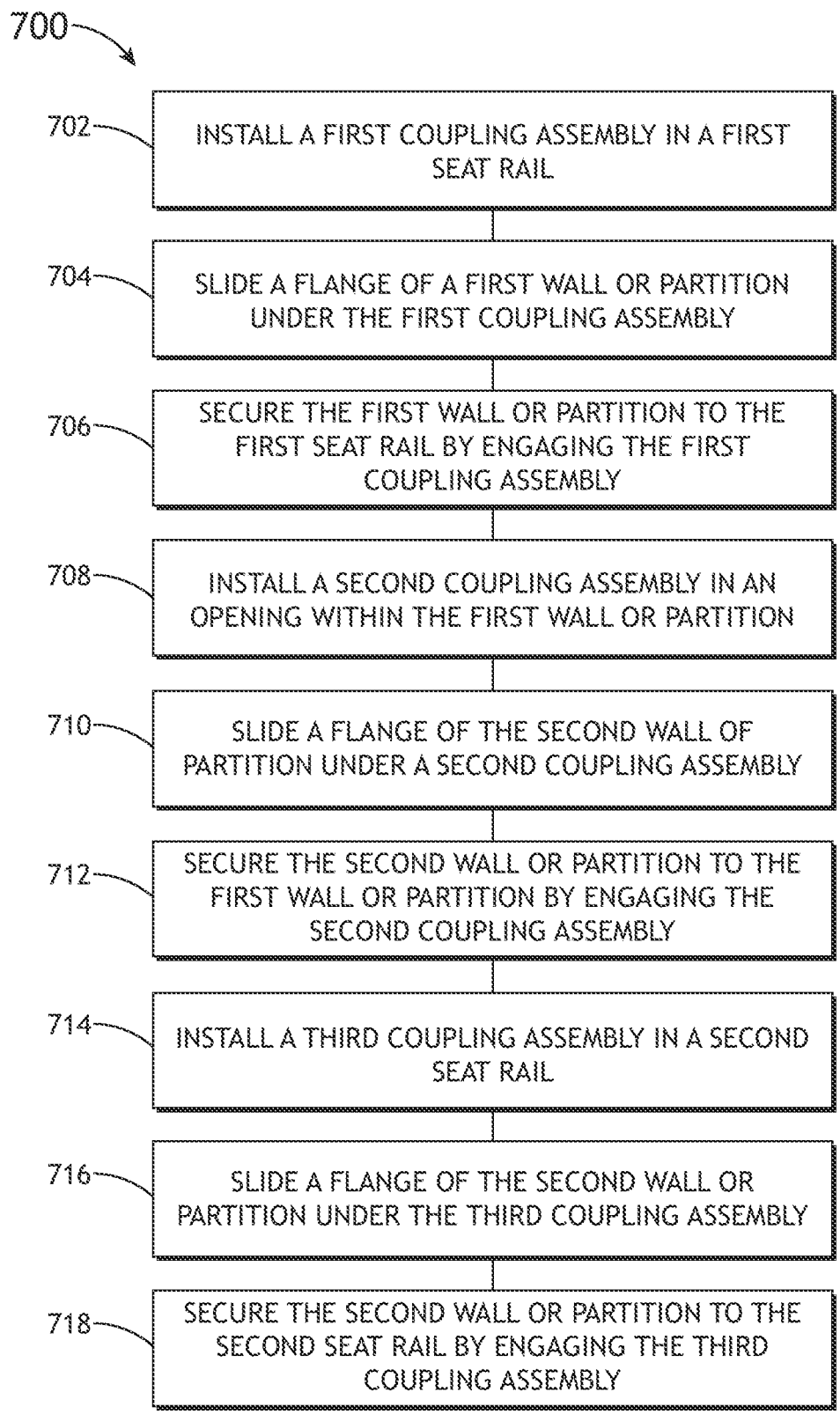
FIG. 7 is a flow diagram of a method or process of installing an aircraft cabin partition system, in accordance with one or more embodiments of the disclosure.

FIG. 7 illustrates a method or process 700 of installing the partition system 100 within the aircraft cabin 102, in accordance with one or more embodiments of the present disclosure. It is noted herein that the steps of method or process 700 may implement all or a part of the system 100 as illustrated in FIGS. 1A-6B. It is further recognized, however, that the method or process 600 is not limited to the system 100 illustrated in FIGS. 1A-6B in that additional or alternative system-level embodiments may carry out all or part of the steps of method or process 700.

In a step 702, a first coupling assembly 200 may be installed in a first seat rail 106.

In a step 704, a flange 202 of a first wall or partition 112 may be slid under the first coupling assembly 200.

In a step 706, the first coupling assembly 200 may be engaged, securing the first wall or partition 112 to the first seat rail 106.

In a step 708, a second coupling assembly 200 may be installed in an opening 400 within the first wall or partition 112.

In a step 710, a flange 202 of a second wall or partition 112 may be slid under the second coupling assembly 200.

In a step 712, the second coupling assembly 200 may be engaged, securing the second wall or partition 112 to the first wall or partition 112.

In a step 714, a third coupling assembly 200 may be installed in a second seat rail 106.

In a step 716, a flange 202 of the second wall or partition 112 may be slid under the third coupling assembly 200.

In a step 718, the third coupling assembly 200 may be engaged, securing the second wall or partition 112 to the second seat rail 106.

It is noted herein the method or process 700 is not limited to the steps and/or sub-steps provided. For example, the method or process 700 may include more or fewer steps and/or sub-steps. In addition, the method or process 700 may perform the steps and/or sub-steps simultaneously. Further, the method or process 700 may perform the steps and/or sub-steps sequentially, including in the order provided or an order other than provided. Therefore, the above description should not be interpreted as a limitation on the scope of the disclosure but merely an illustration.

Although embodiments of the disclosure illustrate that the coupling assembly 200 may operable solely via manual means, it is noted herein the coupling assembly 200 may include assisting tools or devices. For example, the coupling assembly 200 may be electric-driven or pneumatic-driven. Therefore, the above description should not be interpreted as a limitation on the scope of the disclosure but merely an illustration.

It is noted herein the aircraft cabin 102 may be fitted within additional sensors or other monitoring devices including, but not limited to, weight sensors, cameras, fire and/or smoke detection tools and devices, or the like to better monitor the cargo.

In this regard, the aircraft cabin partition system 100 may allow for the conversion of the aircraft cabin 102 between transporting passengers and hauling cargo. The aircraft cabin partition system 100 may use the one or more seat rails 106 installed within the aircraft cabin 102. The aircraft cabin partition system 100 may include the coupling assembly 200, where the coupling assembly 200 may be quick-connect or quick-release with regard to one or more of the openings 204 in the flange 202, the openings 302 of the one or more seat rails 106, and/or the openings 400 in the walls or partitions 112. The aircraft cabin partition system 100 may include cargo bins 110 that are adjustable, removable, and rearrangeable following the adjusting, removing, and rearranging of the one or more walls or partitions 112.

Although embodiments of the disclosure are directed to an aviation environment, it is noted herein the aircraft cabin partition system 100 is not limited to the aviation environment and/or the aircraft components within the aviation environment. For example, the aircraft cabin partition system 100 may be configured to operate in any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. For instance, the vehicle may include, but is not limited to, an automobile, a bus, a truck, a recreational vehicle (RV), a trailer, or the like. By way of another example, the aircraft cabin partition system 100 may be coupled to and/or configured to operate with an apparatus sold for commercial or industrial use in either a home or a business. Therefore, the above description should not be interpreted as a limitation on the present disclosure but merely an illustration.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft cabin partition system, comprising:
   at least a first partition including a partition cut-out and a first flange, the first flange including a first flange cut-out;
   a first coupling assembly, the first coupling assembly configured to be inserted within the first flange cut-out, the first coupling assembly configured to be inserted within an opening of a seat rail within a floor of an aircraft cabin, the first coupling assembly configured to couple the at least the first partition to the seat rail when engaged;
   at least a second partition including a second flange, the second flange including a second flange cut-out;
   a second coupling assembly, the second coupling assembly configured to be inserted within the partition cut-out, the second coupling assembly configured to be inserted within the second flange cut-out, the second coupling assembly configured to couple the at least the second partition to the at least the first partition when engaged; and
   a cargo box with a plurality of sides defined by the at least the first partition, the at least the second partition, and a fuselage wall.

2. The aircraft cabin partition system of claim 1, the at least the first partition including a second partition cut-out, the at least the second partition including a third flange, the third flange including a third flange cut-out, the aircraft cabin partition system comprising:
   a third coupling assembly, the third coupling assembly configured to be inserted within the third flange cut-out, the third coupling assembly configured to be inserted within the second partition cut-out, the third coupling assembly configured to couple the at least the second partition to the at least the first partition when the third coupling assembly is engaged.

3. The aircraft cabin partition system of claim 1, the at least the second partition including a third flange, the third flange including a third flange cut-out, the aircraft cabin partition system comprising:
   a third coupling assembly, the third coupling assembly configured to be inserted within the third flange cut-out, the third coupling assembly configured to be inserted within a second opening of a second seat rail, the third coupling assembly configured to couple the at least the second partition to the second seat rail when the third coupling assembly is engaged.

4. The aircraft cabin partition system of claim 3, at least one of the first coupling assembly, the second coupling assembly, or the third coupling assembly comprising:
   a lock component configured to be located within at least one of the first flange cut-out, the second flange cut-out, the third flange cut-out, or the partition cut-out;
   an actuator configured to actuate the lock component by engaging and disengaging; and
   one or more sets of spacers or fasteners configured to provide a tensioning force when the actuator is engaged.

5. The aircraft cabin partition system of claim 4, at least one of the second coupling assembly configured to insert in the opening of the seat rail and engage a section of the seat rail or the third coupling assembly configured to insert in the opening of the second seat rail and engage a section of the second seat rail.

6. The aircraft cabin partition system of claim 3, the second seat rail being within the floor of the aircraft cabin.

7. The aircraft cabin partition system of claim 3, the second seat rail being coupled to a fuselage wall.

8. The partition system of claim 1, the plurality of sides of the cargo box defined by the first partition, the second partition, a third partition, and the fuselage wall.

9. The aircraft cabin partition system of claim 8, the cargo box including a volume dependent on at least one of a height of the at least the first partition, a height of the at least the second partition, a distance between the first partition and the fuselage wall, or a distance between the second partition and the third partition.

10. The aircraft cabin partition system of claim 8, the at least the first partition being parallel to an aisle of the aircraft cabin, the at least the second partition being perpendicular to the aisle of the aircraft cabin.

11. The aircraft cabin partition system of claim 10, the second partition and the third partition being perpendicular to the first partition.

12. The aircraft cabin partition system of claim 1, the partition cut-out being aligned with the opening of the seat rail.

* * * * *